United States Patent
Housman et al.

[11] 3,906,201
[45] Sept. 16, 1975

[54] MODULE CARD VERIFICATION SYSTEM

[75] Inventors: William A. Housman, Seattle; Miklos B. Horvath, Redmond, both of Wash.

[73] Assignee: William A. Housman, Seattle, Wash.

[22] Filed: Apr. 23, 1973

[21] Appl. No.: 353,457

[52] U.S. Cl............. 235/61.7 B; 235/61.11 H; 235/61.11 A; 235/61.12 C
[51] Int. Cl.² ............. G06K 7/06; G06K 19/06
[58] Field of Search..235/61.12 C, 61.12 M, 61.9 R, 235/61.7 B, 61.11 E, 61.11 K, 61.11 D, 61.11 H, 61.11 R; 40/2.2; 177/314; 340/149 A; 346/74 S

[56] References Cited
UNITED STATES PATENTS

| | | | |
|---|---|---|---|
| 2,517,619 | 8/1950 | Ainley | 177/314 |
| 3,218,647 | 11/1965 | Fenner | 235/61.11 H |
| 3,353,006 | 11/1967 | Pollock | 235/61.7 B |
| 3,404,382 | 10/1968 | Rosenheck | 235/61.11 H |
| 3,544,769 | 12/1970 | Hedin | 235/61.9 R |
| 3,624,938 | 12/1971 | Richard | 40/2.2 |
| 3,655,946 | 4/1972 | Morita | 235/61.7 B |
| 3,665,161 | 5/1972 | Oberhart | 235/61.7 B |
| 3,699,311 | 10/1972 | Dunbar | 235/61.11 H |
| 3,731,076 | 5/1973 | Nagata | 235/61.7 B |

*Primary Examiner*—Daryl W. Cook
*Assistant Examiner*—Robert M. Kilgore
*Attorney, Agent, or Firm*—Seed, Berry, Vernon & Baynham

[57] ABSTRACT

A card validator employs a replaceable module which houses a prearranged pattern of conductors and logic circuitry that is coupled with the inputs from a memorized code and a precoded credit card. The logic circuitry compares the memorized and credit card codes and indicates whether they are identical. If the memorized and credit card codes are not identical, the credit card is made unusable. The module is completely sealed so that tempering or visual inspection of the internal conductor pattern is impossible. Furthermore, the internal logic circuitry prevents determination of the conductor pattern through the use of electrical measuring instruments on the external connections of the module.

4 Claims, 4 Drawing Figures

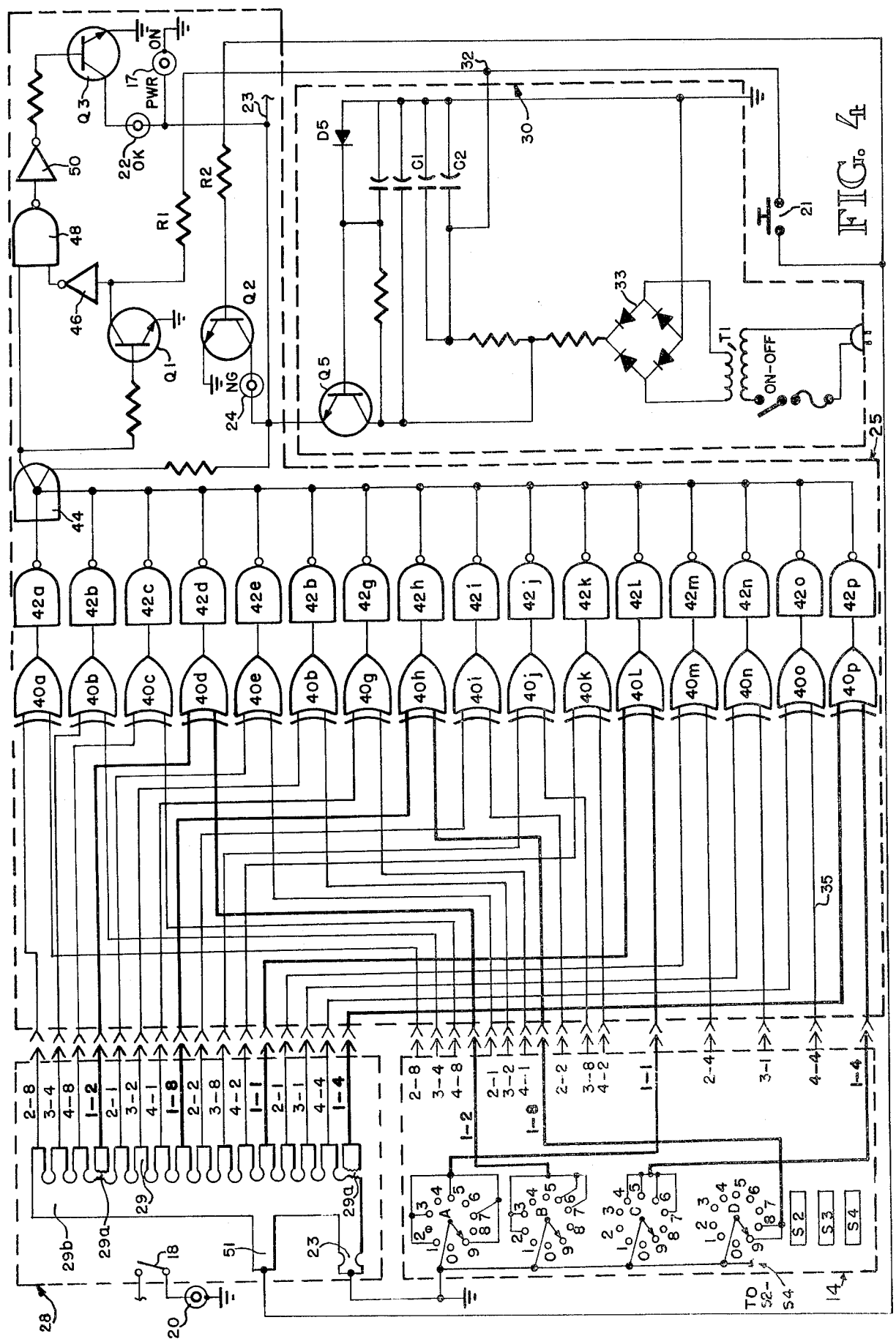

MODULE CARD VERIFICATION SYSTEM

BACKGROUND OF THE INVENTION

1. Field of the Invention

This invention pertains to electronic validators and, more particularly, to a validator of the type which compares a memorized code with a code contained in a card.

2. Description of the Prior Art

Various types of credit card, identification card, or the like types of validators have been used heretofore. One such validator is described in Housman U.S. Pat. No. 3,641,499. One of the problems with prior art validators, particularly those which verify the authenticity of a user of a credit card, is that a similar validator may be stolen and examined by a skilled electrician to determine the internal conductor patterns and possibly determine the memorized code necessary to use any particular credit card.

SUMMARY OF THE INVENTION

It is an object of this invention to provide a card validator having an internal pattern of coded conductors that cannot be uncoded by visual or electrical examination of the validator.

It is another object of this invention to provide a card validator in which memorized and precoded card combinations are compared and in which the comparison circuits may be changed quickly and inexpensively to render obsolete all the memorized and precoded card combinations usable prior to the change.

Basically, these objects are accomplished by the use of a replaceable module which contains an internal precoded pattern of conductors in combination with internal solid state logic circuitry. The module is plugged into a card validating machine which receives a memorized code and a card with a precoded arrangement of conductors. The precoded arrangement of conductors and the electronic circuitry in the module cannot be detected by a visual or electrical examination of the module. Any effort to examine the module internally will destroy it. The memorized precoded card combination for an entire series of cards may be rendered obsolete merely by replacing the module with a module having a different prearranged precoded conductor pattern.

BRIEF DESCRIPTION OF THE DRAWINGS

FIG. 4 is a schematic circuit diagram of the credit card, module, and the validator shown in FIG. 1.

DESCRIPTION OF THE PREFERRED EMBODIMENTS

Figure 1:
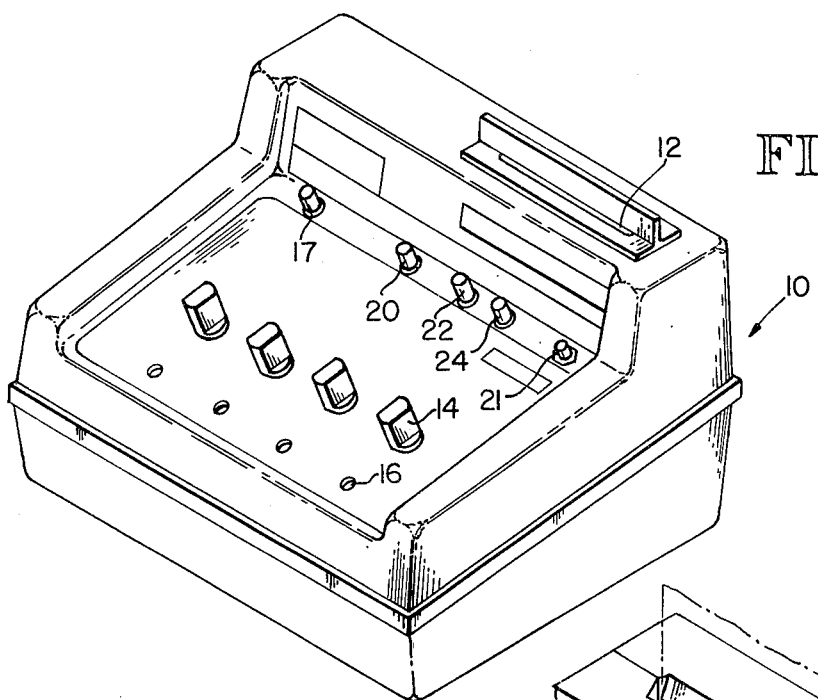
FIG. 1 is a perspective view of a credit card validator embodying the principles of the invention.
Figure 2:
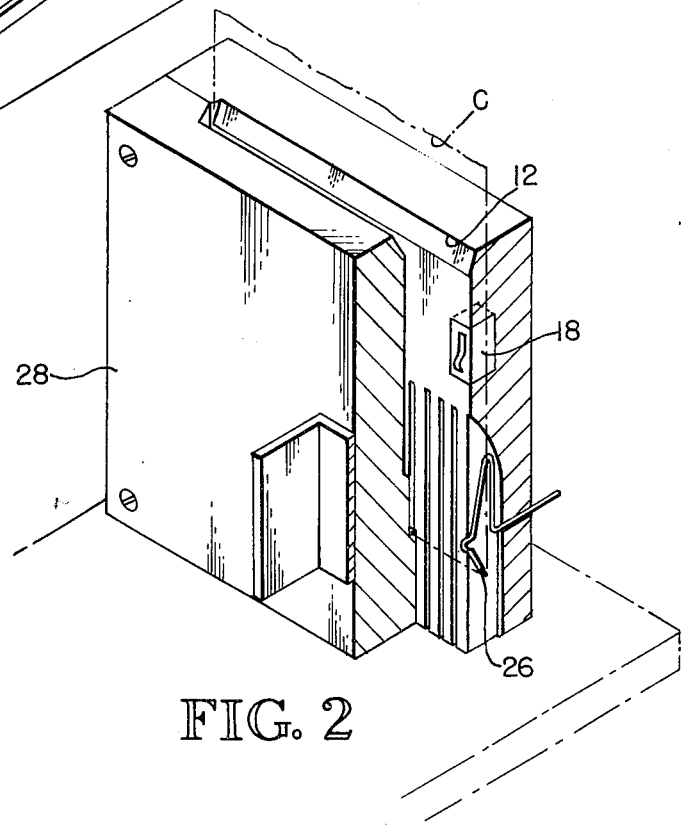
FIG. 2 is a fragmentary detail of a portion of the card validator shown in FIG. 1.
Figure 3:
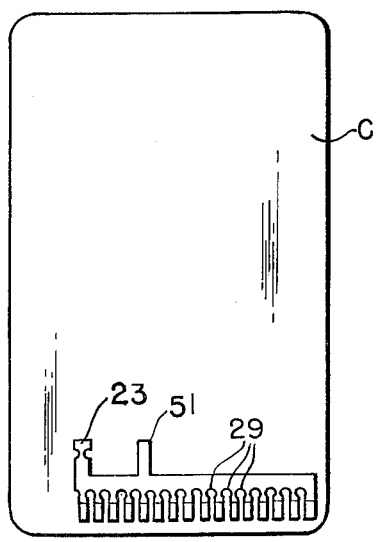
FIG. 3 is a schematic illustration of a typical credit card with embedded circuitry for providing coded inputs.

In general, the credit card validator 10 includes a card receiving slot 12, a plurality of rotary switches 14, a plurality of windows or position indicators 16 which indicate the number corresponding to the position of each of the switches 14, and a power on light 17. When a credit card is inserted into the slot 12, a switch 18 is closed by the card allowing a ready-to-test lamp 20 to light. The operator then dials in the memorized code on the rotary switches 14 and presses a push-to-test switch 21. If the code imbedded in the credit card C matches the memorized code dialed into the rotary switches 14, the O.K. lamp 22 will light. If the codes do not match, the code in the credit card will automatically be made unusable and the N.G. (no good) lamp 24 will light. Codes may be changed simply by removing a plug-in module 25 and replacing it with a new one which combines the signals from the card C and the signals from the rotary switches 14 in a different order. The plug-in module 25 is a sealed unit such as by potting. The use of solid state semi-conductor circuit devices prevents determination of the internal circuitry by examination of the external connections. Any attempt to open the unit or to tamper with the internal connections will render the module inoperable.

In the preferred embodiment, the binary coded decimal (BCD) system is used. Each wafer, A, B, C, D respectively, of the four-wafer rotary switches 14 is assigned a different decimal value. The values are 1, 2, 4 and 8. The decimal value of all four wafers for each switch is the sum of the assigned values of the grounded outputs. Four switches 14, identified as S1, S2, S3 and S4 are provided to provide for a four-digit memorized code. More switches using additional numbers or letters may also be used. Each output from the rotary switches is compared within the module with a corresponding output from the credit card C. A more detailed description of the preferred embodiment will now be given using one digit, namely, nine, as an example. It should be understood that an identical comparison is made for the remaining switches and credit card inputs.

A power supply 30 provides a 5 volt D.C. output at the emitter of transistor of Q5 and a 16 volt D.C. output at conductor 32. The output from the power supply is used to operate the logic elements and the indicator lamps. A.C. voltage is reduced by the transformer T1 and is rectified to a D.C. voltage by the fullwave rectifier 33. The regulated D.C. output to drive the logic elements and the lamps are established by a zener diode D5. The higher 16 volts D.C. is used to melt or destroy the main fuse circuit 23 in the credit card C. The capacitor C1 and C2 provide energy storage to assure complete destruction of the main fuse circuit.

The credit card C is provided with an internal layer having conductors coupled to conducting material brought to the outer layer to electrically connect with the contacts 26 of the card reader assembly 28. The conductors are merely short metallic strips each having a reduced fuse portion which may be broken as at 29a to separate the conductor from the common buss 29b. The switches 26 are arranged such that with complete insertion of the card into the card reader 28 the switches 26 will contact the ends of conductor 29 beyond the fuse portions so that a broken conductor will cause an open circuit at the respective switch 26. Of course, when the main fuse link 23 is broken, no circuit can be completed through the card.

The module 25 plugs into the validator 10 and connects with the conductors leading from the card reader 28 and the rotary switches 14. The internal pattern of the conductors 35 of the module are arranged to contact various of the different conductors of the card reader and the rotary switches depending upon their position in the module. Thus, the entire logic pattern of the internal circuitry in the module 25 could be changed by the rearranging of conductors 35 relative to their external plug-in terminals. The conductors 35 are coupled to a row of exclusive-or gates 42a–40b. Exclusive-or gates require both inputs to be of the same order (either both high or both low) in order to provide a low output. The outputs from the exclusive-or gates are connected to Nand gates 42a–42d. The Nand gates require all connected inputs to be high to provide a low output. A wired-or function is accomplished by connecting the outputs of the Nand gates. Thus if any of the Nand gate outputs are low, the output of the wired-or function is low. Open circuits will be recognized as high inputs, positive voltages are recognized as high inputs and the ground is recognized as a low input. Each of the rotary switches 14 has four wafers A, B, C and D which are wired so as to provide the binary coded decimal input. When a rotary switch is set to a desired decimal digit, for example the number 9, ground, that is a low, will be provided from wafers A and D producing lows at one input of each gate 40h and 40l. Assuming the card inserted into the card reader 28 also contains a decimal digit 9 in the same relative position, ground will be provided on the outputs of the card reader assembly 28 and thence into the module 25 to the other inputs of 40h; and 40l. In this example the corresponding conductors and code designations associated with code 1-1, 1-2, 1-4 1-8 are shown with heavy inking. The "1" before the dash indicates the contact set and the 1, 2, 4 or 8 after the dash represents the binary decimal number. Wafers B and C when resting on digit 9 will provide open circuits thus producing highs at the inputs of exclusive-or gates 40d and 40t. The corresponding card terminals 1-2 and 1-4 have their conductors 29 broken as at 29a so that an open circuit is provided at the other inputs of 40d and 40t. Thus, for the case of the first decimal digit 9 exclusive-or gates 40d, 40h, 40l and 40t will all have the same inputs whether both high or both low producing a low output at each of these exclusive-or gates. The remainder of the switches S2–S4 for the other three digits of the memorized code are not illustrated, since the principles are fully understood by the first switch S1 and its four wafers illustrated. Assuming, therefore, that the remainder of the digits are matched correspondingly with proper coded conductors 29 in the card C, the rest of the exclusive-or gates will also have the same inputs, thus producing lows on their outputs.

The outputs of the exclusive-or gates 40a–40 p are connected to the Nand gates 42a–42p, which are in turn connected together to the wired-or function 44. If all the digits from the rotary switches 14 match all the digits from the credit card C, the inputs of all Nand gates 42 will be low, their outputs will be high and the output of the wired-or function will be high.

The high from the wired-or function 44 appears on the base of transistor Q1 and turns it on. When Q1 turns on, the voltage available to the push-to-test switch 21 is held at very nearly ground potential. This occurs because the conducting path from line 32 goes through resistor R1 through transistor Q1 to ground. The value of R1 is small (10 ohms). This nearly ground potential from the collector of transistor Q1 is also routed through an inverter 46 producing a high at its output. This high is routed to a Nand gate 48. The other input of the Nand gate 48 is already high from the output of the wired-or function 44. With both inputs of Nand gate 48 high its output is low. This output is fed to another inverter 50 which has a high output. This high is passed to the base of transistor Q3 turning the transistor on to complete a circuit through the O.K. lamp 22.

In the example given, since a match did occur, pressing the push-to-test switch 21 results in the energization of the O.K. lamp. The NG lamp 24 will not light. The 16 volts potential will not be passed to the card because line 32 and thus the common line 51 is held at nearly ground potential. If a match had not existed, one or more of the exclusive-or gates would have a high and a low at its input, thus producing a high output. The output would then cause the associated Nand gate 42 to have a low output and the wired-or function 44 would have a low output also. This low output would be insufficient to turn on transistor Q1. If transistor Q1 is not turned on, the full 16 volts in available at line 32 and to the push-to-test switch 21. When the switch is depressed, the 17 volts appears across resistor R2 to the base of transistor Q2 energizing a circuit to the NG lamp 24. Simultaneously the 16 volts appears at the conductor 51 on the card C. The fuse link 23 is designed so that it cannot carry the 16 volt potential and is melted. When fuse 23 is broken, a ground can no longer be applied on any of the fuse links 29, thus producing open circuits or highs at all of the exclusive-or gates 40a–40t. Since the ground may still be applied through the various switches 14, it is quite obvious that there will always be a high and low at least one of the exclusive-or gates, thus precluding ever having a match for the particular card.

While the embodiment described is for use with a credit or identification card, the coded system may also be applied on checks, drafts or other medium of exchange for either varifying the identity of the user or verifying that the amount of the check is within authorized limits or both. In addition, a coded identification card can also be used with a similarly coded check for verifying the identity and/or authorized amount thus requiring additional verification mediums to make more difficult unauthorized uses of the checks.

While the preferred of the invention has been illustrated and described, it should be understood that it is capable of variation and modification without departing from the principles of the invention. Accordingly, the invention is not to be limited by the specific form described, but only by a literal interpretation of the claims appended hereto.

The claims of this invention are:

1. A tamper-proof document validator for comparing memorized coded information with a pre-set code on a pre-coded document, comprising a. a power source for providing a first potential;

b. a manually operated code input means electrically connected with said power source for receiving memorized coded information corresponding in a predetermined manner with the pre-set code of said pre-coded document, said code input means including 1. a plurality of output contacts, and 2. a plurality of input switches manually adjustable to correspond with the memorized coded information code for applying said first potential to selected output contacts if and only if said switches are adjusted to correspond with the memorized code;

c. modular validating circuit means connected with said power source for comparing the preset code of the document with the condition of said input switches to produce a first signal upon detecting a pre-determined correspondence between the adjustment of said input switches and the pre-set code of said pre-coded document and for producing a second signal upon detecting the lack of a pre-determined correspondence between the adjustment of said input switches and the pre-set code of said pre-coded document, said modular validating circuit means including
  1. first and second sets of input contacts adapted to be electrically connected with the pre-coded document and the output contacts of said manually operated code input means respectively,
  2. a plurality of logic gates, each said gate having a pair of inputs,
  3. a first set of conductors electrically connecting each said input contact of said first set of input contacts with one input of each said logic gate respectively,
  4. a second set of conductors connecting each said input contact of said second set of input contacts with the other input of each said logic gate respectively, and
  5. potting means for encompassing and integrating said logic gates and said first and second sets of conductors into a single replaceable modular structure, whereby the memorized coded information necessary for obtaining a first signal indicative of valid correspondence between a pre-coded document and manually entered memorized code information may be changed by replacing a modular validating circuit means having first and second sets of conductors arranged to interconnect different input contacts of said first and second sets of input contacts with said inputs of said logic gates.

2. A document validator as defined in claim 1 wherein the pre-coded document includes destructible means for destroying the pre-set code embodied in the pre-coded document.

3. A document validator as defined in claim 2, wherein the pre-coded document includes first and second document input contacts and a plurality of document output contacts adapted to be connected with said first set of input contacts of said modular validating circuit means, said document output contacts being electrically connected with selected document output contacts in accordance with said pre-set code, and further wherein said destructible means includes a fusable conductor connected between said first and second document input contacts and between said first document input contact and said document output contacts and wherein said power source provides a second potential such that the difference between the first and second potential is sufficient to fuse said fusible conductor and further wherein said modular validating circuit includes means for applying said second potential to said second document input contact upon the occurrence of a second signal indicative of the lack of correspondence between the adjustment of said input switches and the pre-set code of said pre-coded document.

4. A document validator as defined in claim 1, wherein said logic gates are exclusive-or gates having a single output and wherein said modular validating circuit means includes output logic means connecting the outputs of said exclusive-or gates for producing said first and second signals.

* * * * *